Figure 3:
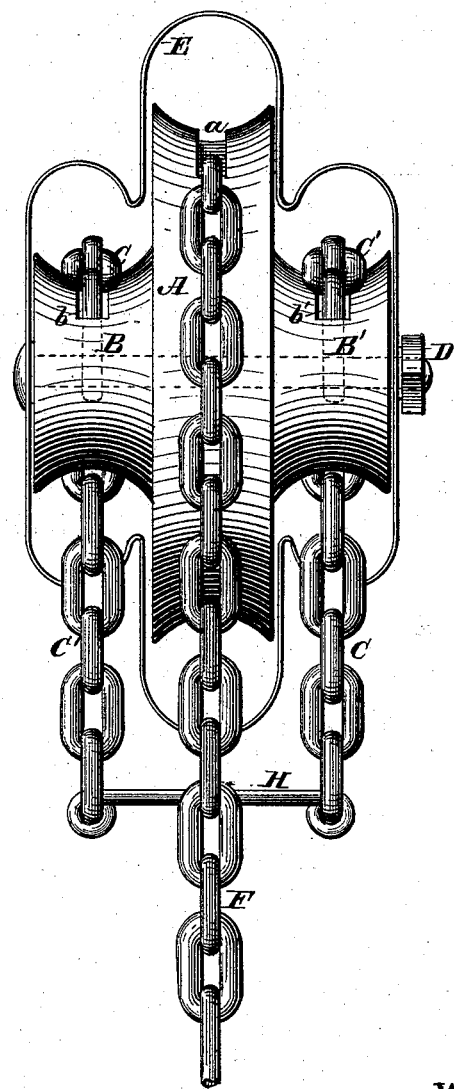

W. A. LAIRD.
Draft-Equalizer.
No. 217,119.   Patented July 1, 1879.
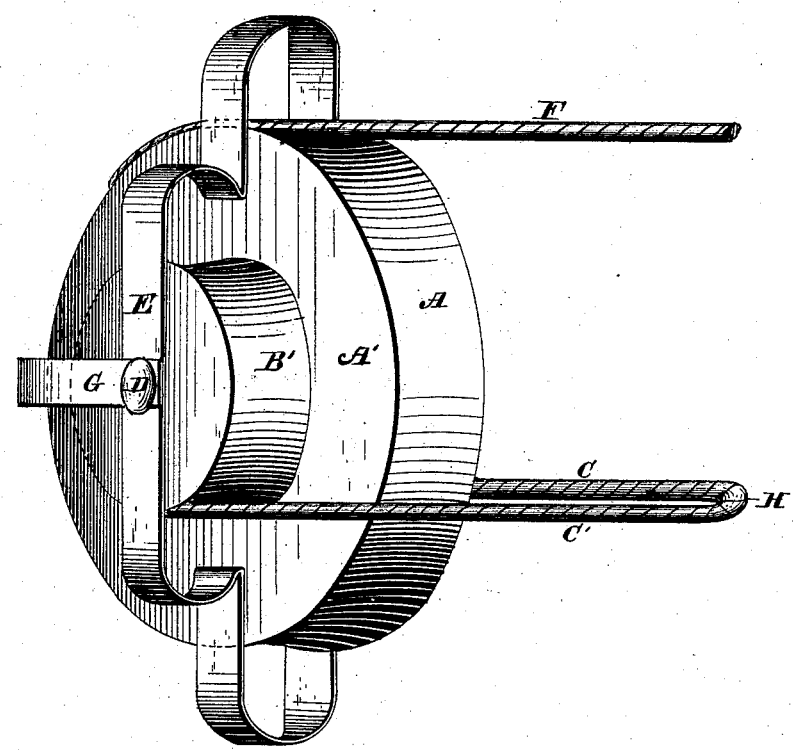
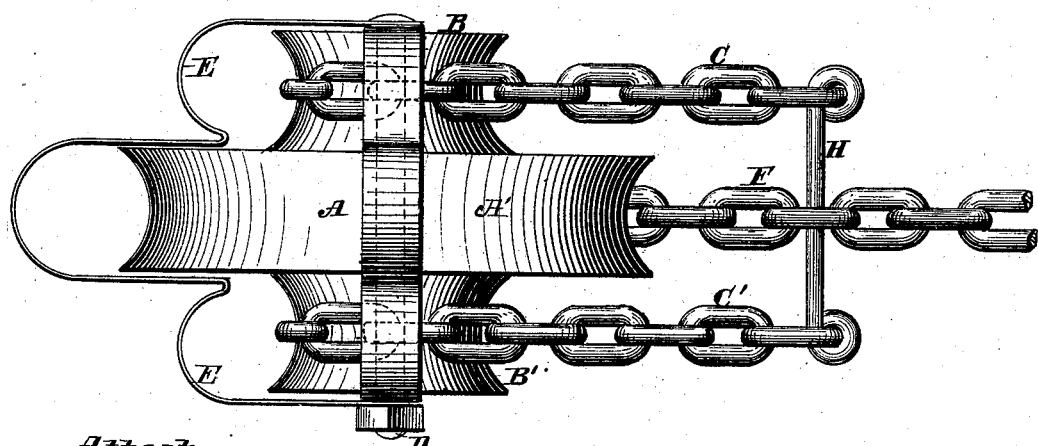
Attest
J. Henry Kaiser
J. A. Rutherford
Inventor:
William A. Laird.
By James L. Norris.
Atty.

W. A. LAIRD.
Draft-Equalizer.

No. 217,119. Patented July 1, 1879.

Attest:
J. Henry Kaiser.
J. A. Rutherford.

Inventor:
William A. Laird.
By James L. Norris.
Atty.

UNITED STATES PATENT OFFICE.

WILLIAM A. LAIRD, OF MANKATO, MINNESOTA, ASSIGNOR OF ONE-HALF HIS RIGHT TO DANIEL D. INGRAM, OF SAME PLACE.

IMPROVEMENT IN DRAFT-EQUALIZERS.

Specification forming part of Letters Patent No. 217,119, dated July 1, 1879; application filed May 13, 1879.

*To all whom it may concern:*

Be it known that I, WILLIAM A. LAIRD, of Mankato, in the county of Blue Earth and State of Minnesota, have invented certain new and useful Improvements in Draft-Equalizers, of which the following is a specification.

My invention relates to that class of devices which are used for the purpose of equalizing or distributing evenly the strain or draft between animals which are hitched to the same vehicle or load.

Its object is to so maintain the equalization of draft, whatever relative positions the animals may occupy, so that one cannot be caused to pull more than his due proportion, but that the unequal powers of all shall be so balanced one against the other that an even and equable draft or strain will result whether the animals all exert themselves equally or one or more should lag.

My invention consists in the combination of grooved sheaves or pulleys of different diameters joined together side by side, and mounted loosely upon an axle extending centrally through the sheaves or pulleys, whereby the latter can revolve thereon, with chains or ropes connected with the sheaves or pulleys, and passing in reverse directions partially around the same, all of which will be fully hereinafter described in detail.

In the accompanying drawings, Figure 1 is a perspective view of my improved three-horse equalizer. Fig. 2 is a top view of the same. Fig. 3 is a front view.

The letter A designates a triple pulley having a central and larger sheave, A', and the two smaller sheaves, B and B', one on each side of sheave A', and firmly connected thereto. This is mounted loosely upon a bolt or axle, D, which passes through the frame E and the centers of the sheaves A, B, and B'. The cord or chain F, to which the middle draft-animal is attached, passes round and over the grooved periphery of the sheave A', through the slot $a$ in its periphery and a radial aperture through the pulley, and is bent around bolt D, forming a loop, which may be secured in any suitable manner, the strain of the cord or chain F being over sheave A in a direction from behind forward.

The diameter of sheave A is equal to that of sheaves B and B' put together, and hence it requires a strain of two pounds applied over the latter to equal a strain of one pound applied over sheave A. The cords or chains C and C', upon which power is applied by the draft-animals on either side of the one pulling on the cord or chain F, pass round and over the grooved peripheries of sheaves B and B', through the slots $b$ and $b'$, and are fastened to the bolt or axle D in the same manner as cord F, the strains of cords or chains C and C' being in an opposite direction from that of cord or chain F. To the end of cord or chain F is attached a single-tree for the attachment of a draft-animal, while the cords or chains C and C' are connected by the bar H, to which a double-tree is fastened for the attachment of other draft-animals. The frame E is attached to the load by a suitable clevis or other device.

In case either of the two sheaves C or C' is dispensed with the connecting-bar H will not be used, and a double-tree will be attached to the cords or chains C or C' of the smaller sheave retained in the device, to which two draft-animals will be harnessed.

Having thus described at length the various portions of my invention, I will now proceed to explain how it can most readily be put in operation.

In case three sheaves are used, it will readily be understood that, the diameter of the center one being equal to the diameters of both the others put together, it will require a strain upon each of the smaller sheaves equal to half that put upon the larger one to equalize the power applied, and as the cords or chains C and C', attached to the smaller sheaves, B and B', pull in an opposite direction, or against the cord or chain F of the larger one, A, the draft-animals, whether pulling in a straight line, abreast, or otherwise, will still pull with an equal strain upon the load or weight to which frame E is attached. Where chains are used a terminal link or ring of each can be passed through the slots and radial apertures in the sheaves, and the axle passed through said link or ring to fasten the chains to the sheaves, while the bar H can be passed through similar terminal links or rings at the other end of the chains.

Heretofore a draft-equalizer has been constructed of a stepped pulley, and each formed with a journal projecting from each of its sides, which are fitted in recesses formed in the interior sides of a casing inclosing the pulleys, suitable chains being passed through the casing and connected with the stepped pulley, and passing partially around the same in reverse directions, and such I hereby disclaim.

What I claim is—

1. In a draft-equalizer, the grooved sheaves or pulleys of different diameters, arranged side by side, and loosely mounted upon an axle passing centrally through the same, and each sheave constructed with a radial aperture extending from the periphery to the axle, in combination with chains or ropes passing partially around the sheaves, and having their ends passed through the radial apertures, and connected with the axle on which the sheaves revolve, all substantially as and for the object set forth.

2. The combination of the enlarged central sheave, A, and the sheaves B B', of a less diameter, arranged on each side of the former, all united together and mounted loosely on an axle passing centrally through all the sheaves, each of the latter being constructed with a radial aperture extending from the axle to the periphery, in combination with the chains or ropes F, C, and C', passing partially around the sheaves in reverse directions, and their ends passed through the radial apertures and connected with the fixed axle on which the sheaves revolve, substantially as shown and described.

In testimony that I claim the foregoing I have hereunto set my hand in the presence of the subscribing witnesses.

WM. A. LAIRD.

Witnesses:
A. R. PFAN,
W. B. TONEY.